United States Patent [19]

Lynn

[11] Patent Number: 5,127,609
[45] Date of Patent: Jul. 7, 1992

[54] JET BLAST DEFLECTOR FENCE

[76] Inventor: B. Stanley Lynn, Pajaro Dunes, H-11, Watsonville, Calif. 95076-0000

[21] Appl. No.: 660,732

[22] Filed: Feb. 25, 1991

[51] Int. Cl.⁵ .............................................. B64F 1/2 G
[52] U.S. Cl. .............................. 244/114 B; 256/12.5; 181/218
[58] Field of Search ............... 244/114 R, 114 B, 1 N; 181/210, 218; 256/12.5, 1, 24–26, 73

[56] References Cited

U.S. PATENT DOCUMENTS

| | | | |
|---|---|---|---|
| 3,007,539 | 11/1961 | Brewer et al. | 244/114 B |
| 3,126,176 | 3/1964 | Lynn | 244/114 B |
| 3,307,809 | 3/1967 | Lynn | 244/114 B |
| 3,386,528 | 6/1968 | Kurtze | 121/218 |
| 4,471,924 | 9/1984 | Lynn | 244/114 B |

FOREIGN PATENT DOCUMENTS

| | | | |
|---|---|---|---|
| 568649 | 1/1959 | Canada | 244/114 B |
| 1531538 | 4/1970 | Fed. Rep. of Germany | 244/114 B |

*Primary Examiner*—Galen Barefoot
*Attorney, Agent, or Firm*—William W. Burns

[57] ABSTRACT

A jet blast deflector fence designed to present a cleaner, simpler, aesthetically pleasing appearance, the deflector fence comprised of simple frames which include only two structural members, a curved rib channel member securedly and hingedly attached to an airport apron and a vertical King post of angle iron which is rigidly secured at its lower end and hingedly attached at its upper end to the channel. A corrugated deflection surface overlies and is fastened to the curved rib members. Because of the respective hinged attachments of the rib members to the apron and the King posts to the rib members the distance between the lower end of the channel member and the King post can be adjusted to reduce the apron space required for the fence. One or more ventilating slots are included to reduce turbulence in order to improve deflection performance.

5 Claims, 4 Drawing Sheets

FIG_1
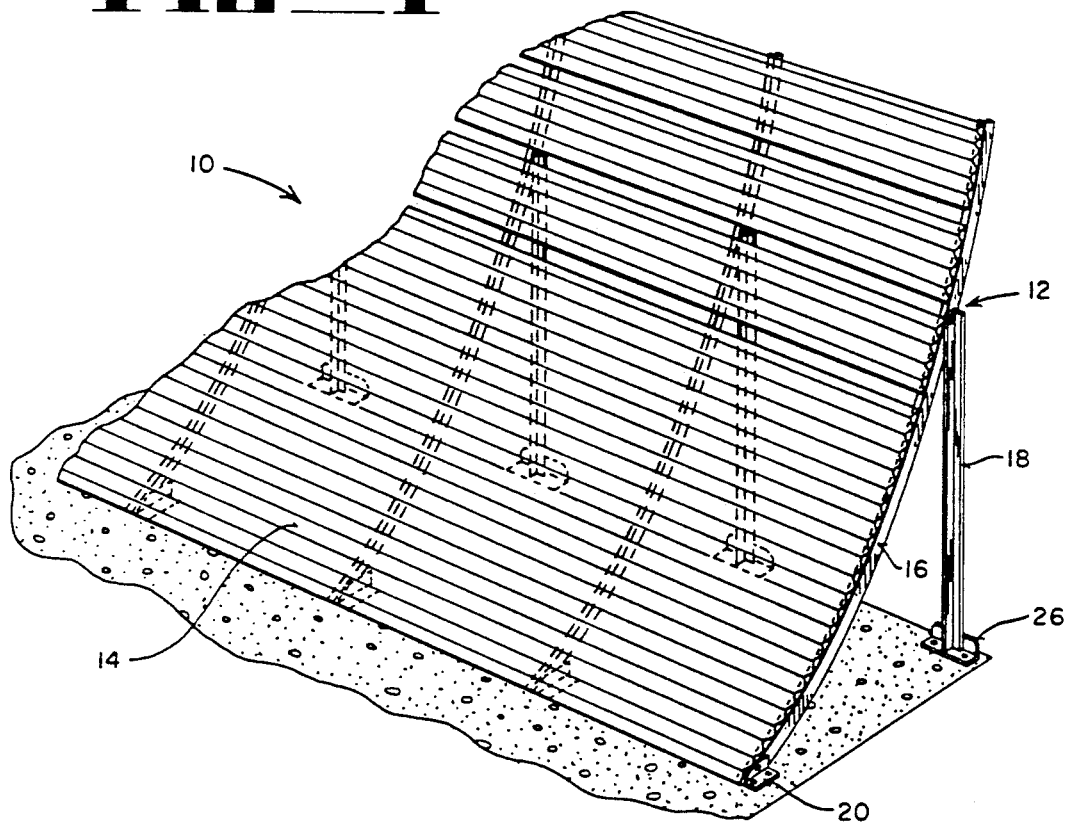
FIG_2
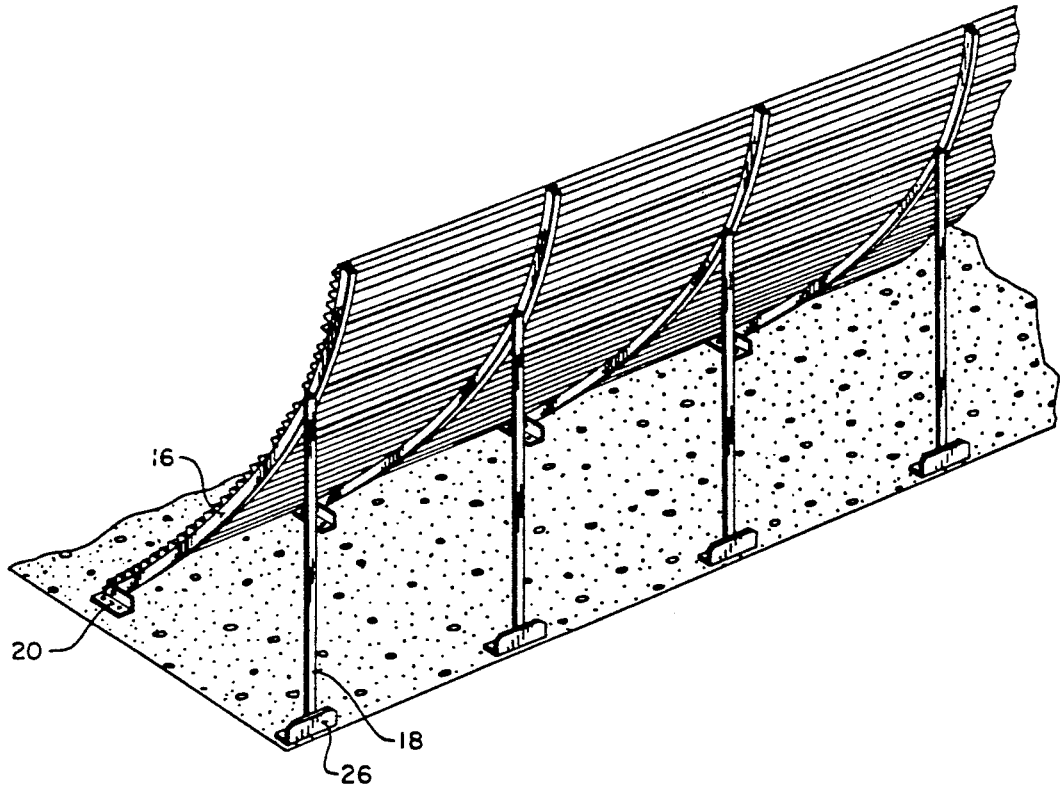

FIG_3
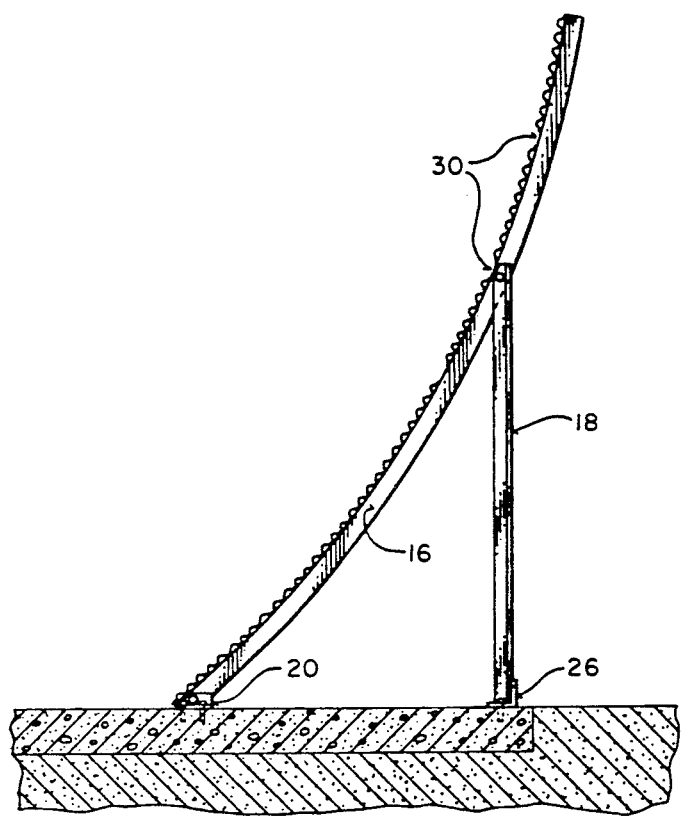
FIG_4
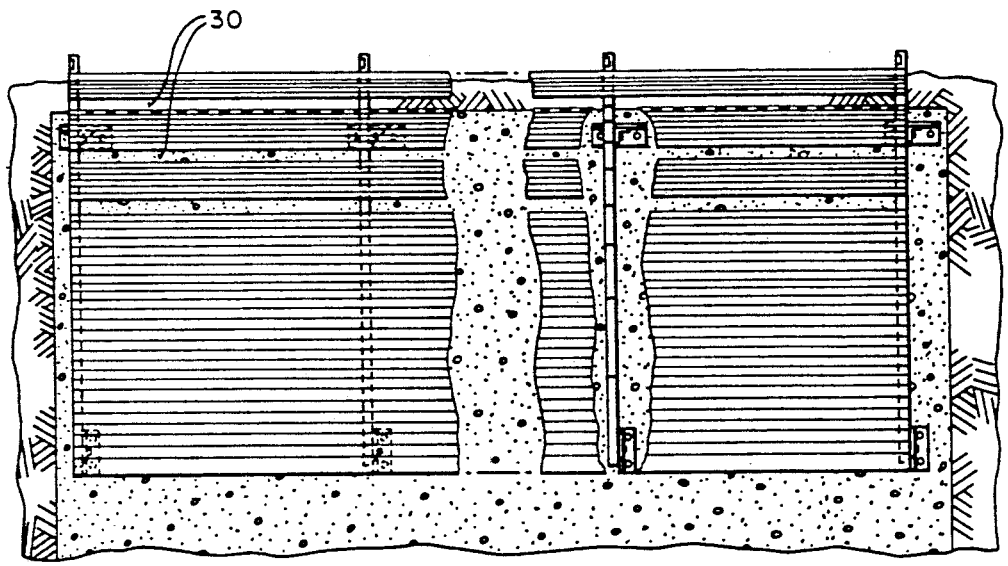

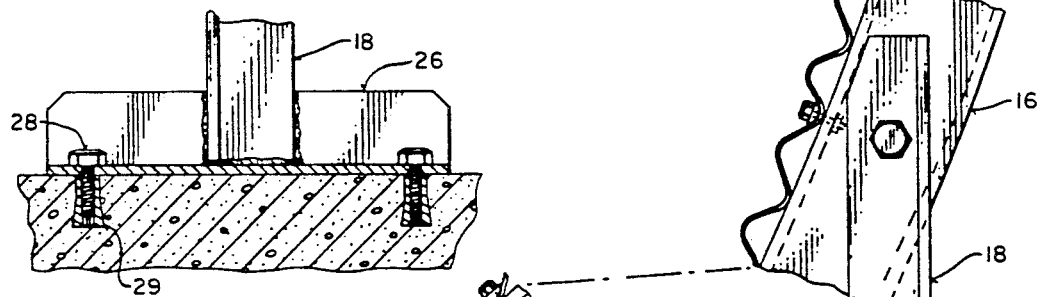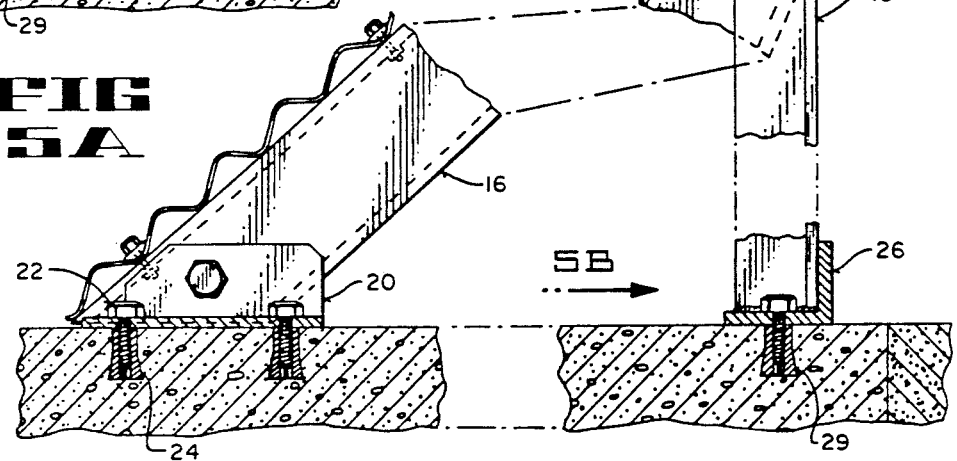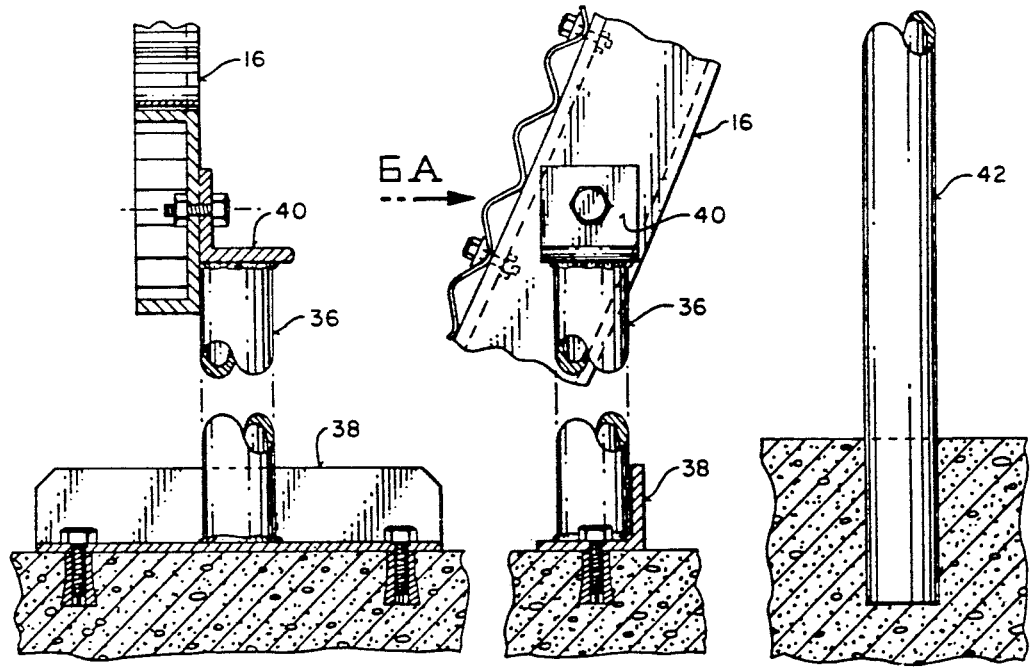

FIG_8
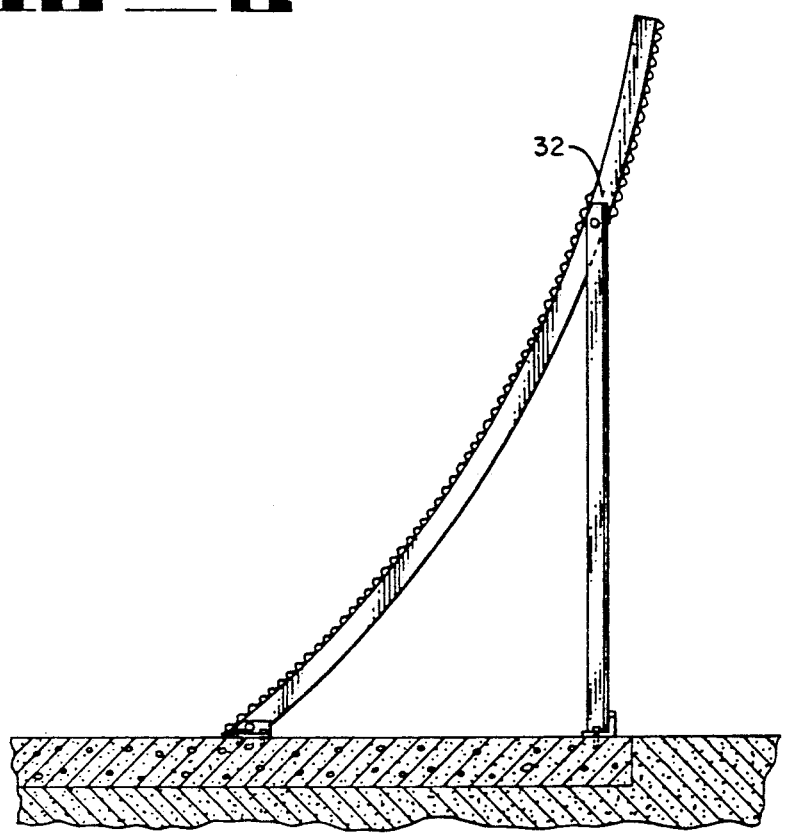
FIG_9
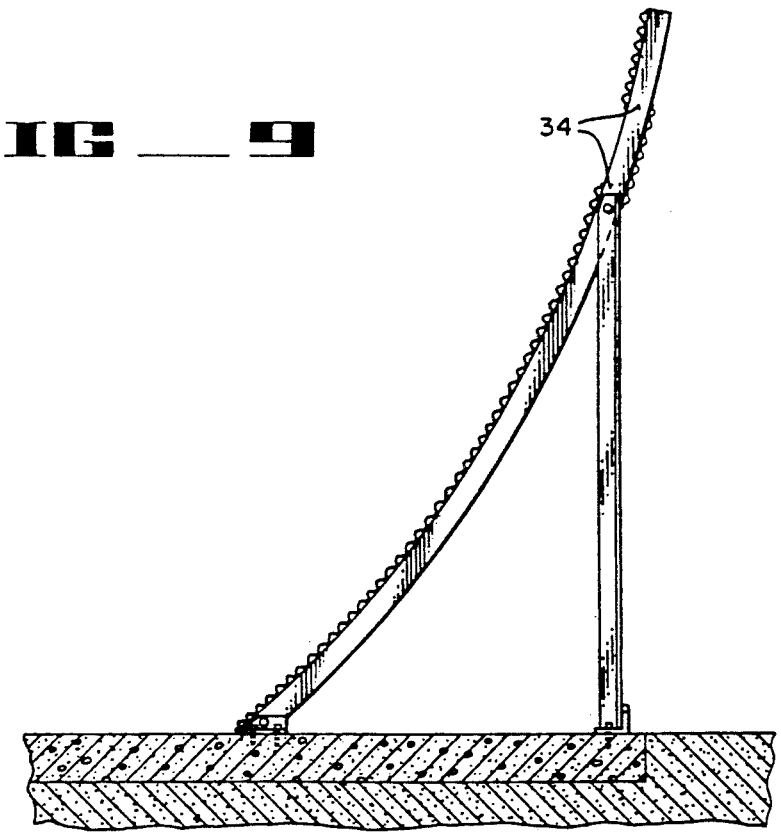

JET BLAST DEFLECTOR FENCE

BACKGROUND OF THE INVENTION

1. Field of the Invention

The present invention relates to jet blast deflection fences for upwardly deflecting the horizontal blasts of various types of jet and turbo prop aircraft, and more particulary the present invention pertains to new and improved support structure that is of ultimate simplicity, aesthetically pleasing and saves valuable operational space. Longitudinal ventilating slots are included to reduce turbulence in order to improve deflection performance.

2. Description of the Prior Art

With the advent of the jet aircraft the areas in and around airports have been subjected to hazardous rearward jet blasts which are composed of hot gases that have been accelerated to high velocities. The hazard of the jet blast gave rise to the blast deflector fence which normally redirects the horizontal jet blast to a vertical direction in order to protect persons and property on the ground.

During the past thirty (30) years blast deflector fences have developed into expensive complex structures requiring many supporting members shaped into complex rib frames to which a corrugated steel deflecting surface is bolted. Heights of 6 feet to 8 feet were sufficient to deflect the blasts of commercial and military aircraft of 25 to 30 years ago, as a simple structure as illustrated in the U.S. Pat. No. 3,126,176 issued to B.S. Lynn. Mar. 24, 1964. However, with passing time, aircraft have been developed with more powerful engines with thrust centerlines of up to 32 feet or more above grade level. The average and most used height of deflector now at modern airports is 14 feet, rather than the 7 foot to 8 foot heights of 25 to 30 years ago. The 14 foot height requires numerous braces to form a rib truss, in addition to horizontal stringers across the back of the rib frames, and diagonal braces to prevent side to side movement or swaying, and to reduce vibration of the rib frames caused by the pulsating blasts, not always normal to the longitudinal axis of the deflector. Such supporting structure, for example, is illustrated in U.S. Pat. No. 4,471,924 issued to B.S. Lynn, Sep. 18, 1984.

In addition, airport operational aprons were not as expensive and crowded 25 years ago, so that fore and aft distances from front anchor bolts to rear anchor bolts were relatively large. In some cases, the base distance was about equal to the fence height to keep the overturning movement low in order to reduce uplift on the front anchor bolts, so that lighter and less expensive foundations could be used. Recently, however, shortcomings in modern deflectors became apparent: (1) Complaints were made by modern airports that the numerous braces required gave the structure an unfinished and unpleasing appearance and (2). The side base of the popular 14 foot high deflector (distance between front and rear anchor bolts) used up too much valuable space, as the larger aircraft and increased numbers of aircraft overcrowded the very costly parking ramps and operating areas. The improvements embodied in the present invention alleviate these problems and provide an improved deflector with clean, simple aesthetic lines, combined with a narrow base which actually creates more usable real estate on crowded operational aprons and other areas where jet blast deflector fences are required. In addition, the novel vertical strut hinged at the top permits a simple method of reducing or increasing the base width by simply relocating the anchor bolts, if desired.

SUMMARY OF THE INVENTION

The general purpose of the present invention in its preferred embodiment, which will be described subsequently in greater detail, is to provide a new and improved blast deflector fence which requires no auxiliary structural bracing of the rib frames, which utilizes less airport apron space, and which presents a cleaner, simpler, more aesthetically pleasing appearance with better aerodynamic efficiency than existing fences. To attain these advantages, the present invention requires a simpler supporting frame for the corrugated deflection surface. The supporting frame is comprised of only two (2) major structural items: (1) The rigidly mounted King post of angle iron and a curved rib channel which is securely bolted to the concrete foundation at the front (leading edge) through an angle clip fastened to the pavement. The upper end of the King post is pivotally secured to the curved rib channel at about ⅔ of the height of the channel. This pivotal attachment of the King post allows the distance between the lower attachment point of the rib channel and the base of the King post to be adjusted to reduce the amount of apron used.

There has thus been outlined rather broadly, the important features of the present invention in order that the detailed description thereof that follows may be better understood, and in order that the present contribution may be better appreciated. There are, of course, additional features of the invention that will be described hereinafter and which will form the subject matter of the claims appended hereto. Those skilled in the art will appreciate that the concept, upon which this disclosure is based, may readily be utilized as a basis for designing of other structures for carrying out the several purposes of the present invention. It is important, therefore, that the claims be regarded as including such equivalent construction so far as they do not depart from the spirit and scope of the present invention.

As such, it is an object of the present invention to provide a new and improved jet blast deflector fence which has all of the advantages of the prior art jet blast deflector fences and none of the disadvantages.

It is another object of the present invention to provide a new and improved jet blast deflector fence which may be efficiently and easily manufactured and marketed.

It is a further object of the present invention to provide a new and improved jet blast deflector fence which may be efficiently and reliably assembled.

It is a still further object of the present invention to provide a new and improved jet blast deflector fence that presents a cleaner, simpler, more aesthetically pleasing appearance than existing blast fences.

An additional object of this invention is to provide ventilating slots easily compatible with the construction herein described in order to increase the aerodynamic performance of the deflector fence.

Even another object of the present invention is to provide a new and improved jet blast deflector fence that is of durable and rugged construction.

Still another object of the present invention is to provide a new and improved jet blast deflector fence which is simpler and less costly to construct than existing fences.

Still yet another object of the present invention is to provide a new and improved jet blast deflector fence which uses less airport apron space resulting in a lowered cost of use.

An even further object of the present invention is to provide a new and improved jet blast deflector fence which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, references should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front perspective view of the jet blast deflector fence of the Preferred Embodiment.

FIG. 2 is a rear perspective view of the jet blast deflector fence of the Preferred Embodiment.

FIG. 3 is an end view of the jet blast deflector fence of the Preferred Embodiment.

FIG. 4 is top elevation view of the jet blast deflector fence of the Preferred Embodiment partly broken away for clarity and particularly illustrating the open slots or gaps.

FIG. 5A is an end view of the jet blast deflector fence of the Preferred Embodiment with portions of the supporting structure broken away for clarity.

FIG. 5B is a sectionalized view of the rear upright support or King post bolted to the concrete apron, in a front view.

FIG. 6A is a front elevation view of the alternate tubular upright support member or King post with portions broken away.

FIG. 6B is an end elevation of the alternate tubular upright support member or King post with portions broken away.

FIG. 7 is a view of the tubular support member wherein the lower end of the member resides in a bored hole in the concrete apron.

FIGS. 8 and 9 are elevations which illustrate shielded slots or vents.

DESCRIPTION OF THE PREFERRED EMBODIMENT

Referring now to FIGS. 1 through 5B, the elements of the jet blast deflector fence of the present embodiment are well disclosed. The jet blast deflector fence 10 is shown installed upon a concrete operational apron of an airport. In its Preferred Embodiment the jet blast deflector fence 10 is comprised first of a series of structural support frames 12 and secondly, a deflector surface 14. The structural support frame 12 consists primarily to two (2) structural members, a curved rib or channel member 16 and an upright strut member or King post 18. The rib or channel member 16 of the Preferred Embodiment is formed of standard five inch steel channel that has been rolled such that the outer edges of the channel flanges form the fore and aft edges of the curve. This method of curving the channel creates increased strength in the channel to resist torsion, bending, or twisting. At its lower end, the rib or channel member 16 is pivotally bolted to a front anchor clip 20. At a point ⅔rds of the distance from the lower end to the upper end of the curved rib 16, the rib 16 is pivotally bolted to the upper end of the upright strut or King post 18.

The front anchor clip 20 is comprised of a steel angle that includes an upright leg to which the rib 16 is pivotally bolted and a horizontal leg that is bolted to the concrete apron or fixed foundation. In the Preferred Embodiment, the clip 20 (FIG. 5A) is secured to the apron by means of two ⅜ inch diameter cap screws or threaded fasteners 22 which mate with Hilti expansion type anchors 24 that have been installed in holes which have been drilled into the concrete apron. The holes are bored 6 inches apart on a center line that is parallel with the web of the channel member 16. Upon installation and expansion and forced expansion of the Hilti anchors, the anchors are sealed with an epoxy cement that is utilized to create an extremely strong and resilient bond between the anchors and the concrete apron. Before insertion of the cap screw 22 the anchor 24 is filled with epoxy resin. As the cap screw 22 is threaded into the expanded anchor the epoxy resin is forced through the slots in the anchor 24 into contact with the walls of the bore into which the anchor 4 is sunk. The epoxy creates a bond at the interface between the outer wall of the anchor 24 and the wall of the bore that is extremely strong, resilient, absorbs vibration, and prevents powdering and frost spalling at the bond.

The lower or bottom end of the strut member or King post 18 (FIG. 5B) is welded to the rear anchor clip 26. The rear anchor clip 26 is comprised of a steel angle that includes an upright leg and a horizontal leg that is bolted to a concrete apron by means of two ⅜ inch diameter cap screws or threaded fasteners 28. The cap screws 28 that secure the rear anchor clip are separated by 12 inches on a center line that is perpendicular to the center line of the cap screws 28 that secure the front anchor clip 20 and are mated to expanded Hilti anchors 29 which are installed in holes that have been drilled in the concrete apron. These Hilti anchors are also locked or secured to the apron by an epoxy cement as previously explained. While the Preferred Embodiment utilizes cap screws and Hilti anchors to secure the anchor clip to the apron or fixed foundations it is the inventor's intent to include standard type anchor bolts such as J-bolts or L-bolts cast in place when the foundation is poured as an alternate method for securing the anchor clips to the foundation.

The opposed bolting pattern of the front 20 and rear anchor 26 clips, wherein the cap screws 22 that secure the front clip 20 are on a center line that is perpendicular to the center line of the cap screws 28 that secure the rear clip, in addition to the wide spacing of the rear anchor bolts creates an extremely rigid footing for the frames of the fence, a footing that resists the severe twists and strains that are created by the jet blasts of even the largest of modern jet transports.

The method of pivotally bolting the channel member 16 in place at its lower end to the clip 20 and near its upper end to the King post 18 allows for ease of alignment and assembly of the frames 12. With the narrower base width of the Preferred Embodiment it is estimated that there would be a savings of up to three feet in width of concrete for each foot of deflector length in the case of a 14 foot high curved blast deflector fence of current design when contrasted with drawings shown in Lynn U.S. Pat. Nos. 3,126,176 and 3,307,309.

Upon bolting the channel member 16 into place with top and bottom bolts, an extremely strong structural support frame 12 is completed without the cross-bracing, stringers, and trusses common to blast fence support structures. It is estimated that the elimination of stringers and diagonal braces customarily used on conventional truss-type rib frames can result in savings of about 15% in materials cost and erection time.

In practice the spacing between the frames 12 is based upon the size and type of jet craft encountered. For normal duty the frames would be spaced six feet apart, for heavy duty four feet apart, and for extra heavy duty used with aircraft such as the Boeing 747 and 767 the frames would be spaced 3 feet apart.

The deflector surface 14 is comprised of a series of corrugated galvanized metal sheets overlying the ribs of 16 of the structural support frames 12. In practice the sheets are formed with corrugations having a pitch of three inches and a depth of one inch. The metal sheets or panels are secured to the front flanges of the channel members or ribs 16 by means of ⅜ inch diameter bolts (FIG. 5A) which are fed through holes in the valleys between corrugations and thence through holes drilled or punched into the flange of the channel member 16 and fastened with a ⅜ inch self-locking nut. A half-oval washer that mates with the contour of the valley is utilized between the bolt and the corrugated metal panel to insure that the panels are tightly secured to the channel member 16.

The corrugated metal panel edges are butted one to the other as they are installed leaving only a small gap between sheets to allow for dimensional differences and are overlapped at the ends using common bolts. Below the 7 foot level it is advisable for safety of personnel behind fences that the deflection surface be solid and substantially free of gaps as the blast is redirected from horizontal to vertical. Above the 7 foot level of fence height the metal panels are spaced upon installation to leave three ventilating gaps 30 of approximately four inches in width which extend the entire length of the fence. The gaps or slots 30 allow the pressures fore and aft of the fence 10 to equalize which smooths out the blast flow thereby reducing turbulence behind the blast fence.

As illustrated in FIG. 4 the three slots or gaps 30 are equally spaced above the 7 foot level. And referring to FIGS. 4, 8, and 9 the slots may be open or shielded. FIG. 4 illustrates open slots 30 with no shielding. FIG. 8 and 9 represent an embodiment employing shielded slots or gaps 32 and 34. Shielding of slots is recommended with to prevent debris from blowing through the fence at high velocity and endangering personnel. Shielding is accomplished by bolting alternate corrugated panels to the rear flanges of the channel member 16 in an orientation wherein the upper edge of a lower sheet overlaps the lower edge of the next upper sheet. This creates a shielded opening that is the width of the channel member 16 as illustrated in FIG. 8. A single shielded slot can be utilized as represented by FIG. 8 or two or three slots can be utilized as illustrated by FIG. 9 wherein the corrugated sheets are alternately bolted to the back then front of the channel members 16. The shielded slots extend along the entire length of the deflector fence.

With reference to FIGS. 6A and 6B therein is presented an alternative to the King post or strut member of the Preferred Embodiment. In this embodiment a tubular steel post 36 is interchangeably substituted for the angle iron post 18 of the Preferred Embodiment. The tubular post is welded at its lower end to an anchor clip 38 that is secured to the apron in exactly the same manner as anchor clip 26 of the Preferred Embodiment. A short length of angle iron 40 is welded to the upper end of the post. The angle iron 40 is oriented such that its horizontal leg is welded to the top of the post and its vertical leg is pivotally bolted to the channel member 16.

A still further embodiment is illustrated by FIG. 7. In place of a rear anchor clip as previously described herein the tubular King post 42 is inserted into a clearance hole bored into the apron and sealed in place by an epoxy cement. A short section of angle iron identical to that illustrated in FIGS. 6A and 6B would be welded to the upper end of the King post 42 for connection to the channel member 16.

With respect to the above description then, it is to be realized that the optimum dimensional relationships for the parts of the invention to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principle of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A new and improved jet blast deflector fence assembly of the type that is secured to an airport apron to deflect the jet blast from passenger aircraft, said assembly comprising:
   (a) deflector support frame means comprised of two structural members, a first member comprising a concave-curved steel channel fastened at its lower end to the apron by front clip means that is bolted to the apron by two spaced cap screws, a second member comprising a vertical King post of angle iron, the upper end of said King post being fastened to said first member at a point that is two-thirds of the distance from the lower end to the upper end of the first member, the lower end of the King post being fastened to the apron by rear clip means that is bolted to the apron by means of two spaced cap screws, the axis upon which the cap screws that secure said front clip means lie being perpendicular to the centerline between the cap screws that secure said rear clip means to give strength and rigidity to the frame, and whereby the fixed horizontal distance between the lower end of the first member and the lower end of the second member is approximately equal to one-half vertical height of the first member when the assembled support frame means is erected on the apron;

(b) corrugated deflector means secured to the first structural member for upwardly deflecting jet blasts, said corrugated deflector means comprising a series of corrugated metal sheets butted together to provide a continuous deflection surface.

2. The jet blast deflector fence assembly of claim 1 wherein the corrugated metal sheets are spaced to define a gap extending the length of the fence above a 7 foot level of fence height to equalize blast pressures fore and aft of the fence, whereby overturning moment tending to overturn the fence is reduced.

3. A new and improved jet blast deflector fence assembly of the type that is secured to an airport apron to deflect the jet blast from passenger aircraft, said assembly comprising:
   (a) deflector support frame means comprised of two structural members, a first member comprising a concave-curved steel channel fastened at its lower end to the apron by means of a front anchor clip that is bolted to the apron, a second member comprising a vertical King post of angle iron, the upper end of said King post being fastened to said first member at a point that is two-thirds of the distance from the lower end to the upper end of the first member, the lower end of the King post being fastened to the apron by means of a rear anchor clip that is bolted to the apron, whereby the fixed horizontal distance between the lower end of the first member and the lower end of the second member is approximately equal to one-half the height of the erected first member reducing the area of apron required to support the blast fence;
   (b) corrugated deflector means secured to the first structural member for upwardly deflecting jet blasts, said deflector means comprising a series of corrugated metal sheets butted together to provide a blast deflection surface, said metal sheets being spaced above seven (7) feet of fence height to form three (3) equal width, equally spaced parallel continuous horizontal slots that extend the full length of the fence, said slots equalizing pressures fore and aft of the fence and reducing overturning moment.

4. A new and improved jet blast deflector fence assembly of the type that is secured to an airport apron to deflect the jet blast from passenger aircraft, said assembly comprising:
   (a) deflector support frame means comprised of two structural members, a first member comprising a concave-curved steel channel fastened at its lower end to the apron by front anchor clip means that is bolted to the apron by two spaced cap screws, a second member comprising a vertical King post of cylindrical steel tubing, the upper end of said King post being fastened to said first member at a point that is two-thirds of the distance from the lower end to upper end of the first member, the lower end of said second member being rigidly encased and sealed by epoxy cement in a hole drilled into the apron to give strength and rigidity to the frame, whereby the fixed distance between the lower end of the first member and the lower end of the second member is approximately one-half of the height of the first member after said frame means is erected;
   (b) corrugated deflector means secured to the first structural member for upwardly deflecting jet blasts, said corrugated deflector means comprising a series of corrugated metal sheets butted together to provide a continuous deflection surface.

5. A new and improved jet blast deflector fence assembly of the type that is secured to an airport apron, said assembly comprising:
   (a) deflector frame means comprised of two structural members including a first member comprising a curved channel that is secured to the apron at its lower end, a second member comprising a vertical King post of angle iron that is secured at its upper end to the first member and that is secured at its lower end to the apron;
   (b) corrugated deflector means secured to said first member for upwardly deflecting jet blasts, said deflector means comprising a series of corrugated metal sheets that are fastened to the curved channel to create a deflection surface, said corrugated metal sheets being alternately secured to the front and then to the back of said curved channel and overlapped to define a slot between said sheets, said slot acting to upwardly or downwardly deflect debris that is blasted through the fence, while simultaneously acting to equalize fore and aft pressures to reduce turbulence behind the fence assembly.

* * * * *